United States Patent
Rauhala

(10) Patent No.: US 6,810,013 B1
(45) Date of Patent: Oct. 26, 2004

(54) PATH OPTIMIZATION IN PACKET-BASED TELECOMMUNICATION NETWORK

(75) Inventor: Kristian Rauhala, San Diego, CA (US)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/402,885

(22) PCT Filed: Apr. 9, 1998

(86) PCT No.: PCT/FI98/00323
§ 371 (c)(1),
(2), (4) Date: Dec. 17, 1999

(87) PCT Pub. No.: WO98/47301
PCT Pub. Date: Oct. 22, 1998

(30) Foreign Application Priority Data

Apr. 15, 1997 (FI) .................................................. 971586

(51) Int. Cl.[7] .................................................. H04J 1/16
(52) U.S. Cl. .................... 370/231; 370/238; 370/236.2; 370/248
(58) Field of Search .............................. 370/236.2, 231, 370/238, 238.1, 295.32, 248, 249

(56) References Cited

U.S. PATENT DOCUMENTS

| | | | | |
|---|---|---|---|---|
| 5,323,394 A | * | 6/1994 | Perlman | 370/238 |
| 5,331,637 A | * | 7/1994 | Francis et al. | 370/408 |
| 5,359,600 A | | 10/1994 | Ueda et al. | 370/60.1 |
| 5,590,126 A | * | 12/1996 | Mishra et al. | 370/329 |
| 6,058,114 A | * | 5/2000 | Sethuram et al. | 370/397 |
| 6,580,715 B1 | * | 6/2003 | Bare | 370/396 |

FOREIGN PATENT DOCUMENTS

| | | |
|---|---|---|
| EP | 616 480 A2 | 9/1994 |
| FI | 961038 | 9/1996 |
| GB | 2 265 278 | 9/1993 |
| GB | 2 298 765 | 9/1996 |

* cited by examiner

*Primary Examiner*—Duc Ho
*Assistant Examiner*—Michael J Molinari
(74) *Attorney, Agent, or Firm*—Pillsbury Winthrop LLP

(57) ABSTRACT

The invention relates to connection-oriented packet-based telecommunication networks such as ATM (Asynchronous Transfer Mode) and particularly to route optimization in such networks. A network node (20) on the route adds to a packet flow a special packet comprising a unique code which the network node (20) locally uses for identifying the special packet and for associating the special packet to a particular formed connection. If there is a loop on the path (2,BTS1,3) the special packet added to the packet flow returns back to the same network node. When the network node detects that the special packet provided with the unique code returns back, it may conclude that on the path of the connection to which the unique code is associated to, there is a loop that should be eliminated. Thereafter the network node may internally switch an optimal path (1,4,BTS2) bypassing the detected loop (2,BTS1,3). Furthermore, the network node preferably releases the loop in a manner characteristic of the network. According to a preferred embodiment of the invention also the elimination of the detected loop is based on the use of the special packet.

22 Claims, 3 Drawing Sheets

PATH OPTIMIZATION IN PACKET-BASED TELECOMMUNICATION NETWORK

This application is the national phase of international application PCT/FI98/00323 filed Apr. 9, 1998 which designated the U.S.

FIELD OF THE INVENTION

The invention relates to connection-oriented packet-based telecommunication networks, such as ATM (Asynchronous Transfer Mode), and particularly to route optimization in such networks.

BACKGROUND OF THE INVENTION

At present, there are two very interesting development trends in telecommunication: mobile communications and broadband networks in which bit rates typically exceed 2 Mbit/s. An example of broadband networks is Broadband Integrated Services Digital Networks.(B-ISDN), the transfer mode of which is selected to be Asynchronous Transfer Mode (ATM). The ATM is a switching and multiplexing solution, particularly relating to a data link layer (i.e. OSI Layer 2, from here on called the ATM layer). ATM enables an implementation of a connection-oriented packet network in the B-ISDN networks, In ATM data transmission-the end user's data traffic is carried from a source to a destination by virtual connections. Data is transferred over switches of the network in standard-size packets of 53 bytes, the packets being called ATM cells. The structure of an ATM cell is illustrated in FIG. 1. An ATM cell contains a header of 5 octets and an information field of 48 octets containing actual payload. The main object of the header is to identify a connection number for a cell sequence forming a virtual channel to a particular call. A physical layer (i.e. OSI Layer 1 ) may comprise several virtual paths which are multiplexed in the ATM layer. The virtual paths are identified by a VPI (Virtual Path Identifier). Each virtual path may comprise a number of virtual channels that are identified by a VCI (Virtual Channel Identifier). The header contains also other fields, such as an HEC (Header Error Control), a GFC (Generic Flow Control), a CLP (Cell Loss Priority) and a PT (Payload Type). The ATM cell contains indirectly the information on the receiver's address, each cell thus being an independent data transfer unit. The number of cells transferred in a time unit is proportional to the user's bandwidth requirements.

The ATM is a connection-oriented traffic technique, but because there is no connection before it is established, a connection establishment request shall be routed from a source through the ATM network to a destination approximately in the same way as packets are routed in packet switched network works. After the connection has been established the cells travel along the same virtual path during the connection.

A third development trend is to introduce wireless data transmission (wireless ATM) and mobility into the ATM networks (wireless ATM). The present B-ISDN and ATM standards do not support as such the additional features required by wireless communication, but different solutions to implement for example mobility management in connection with wireless ATM have already been presented. The aim has been to add wireless data transmission and mobility to the ATM network without significant changes in the existing ATM standards and networks. Such solutions have been presented in the applicant's copending Finnish patent applications 971178 and 970602, for example.

In PLMNs (Public Land Mobile Network) radio interfaces have conventionally been narrowband interfaces. The transmission systems of mobile networks have conventionally been implemented by circuit-switched connections in a star or tree network configuration. In order to increase the capacity and flexibility of the transmission systems, the use of different broadband packet-switched transmission systems or ATM technique in mobile networks has also been proposed, for example in WO 9400959, EP 0366342 and EP 0426269. A possible future development trend is mobile systems having a broadband radio interface. Then a broadband transmission system of the mobile system is also needed, while a potential alternative is ATM technique.

In mobile networks and in a wireless ATM network a terminal does not have any fixed access point to the network, but the terminal and the access point may move in the network. When a virtual connection has been routed to the terminal through the ATM network, the routing must also be changed or extended from an old access point (a base station, for example) to a new one. This procedure is called handover or handoff. In a hard handover, the data transmission is interrupted when the connection is connected from one access point to another. In a soft handover the continuation of the data transmission is secured by the terminal having a connection both with the old and the new AP (Access Point) simultaneously during handover.

Handover and particularly several consecutive handovers can lead to non-optimal routing of a virtual connection. Non-optimal routing refers to a situation in which the virtual connection is not routed directly from one point to another, but the connection travels a longer winding path which is determined according to handover. In the worst case, the virtual connection path has a loop, which starts from and ends at the same network node. Unnecessary loops on the connection path cause delay and use network resources, which is why they should be avoided.

The following simple example illustrates how a routing loop could be produced in a wireless ATM network. Two base stations BTS1 and BTS2 have been connected to an ATM switch 20. BTS1 and BTS2 are also equipped with ATM switching functions. Let us first assume that a mobile station MS has a radio connection with the base station BTS1 and a virtual ATM connection between the base station BTS1 and port 2 of the ATM switch 20. Inside the ATM switch port 2 is connected to port 1 from which a virtual connection has been established (through the ATM network) to a second party. Next, a so-called path extension (PE) handover is performed from the base station. BTS1 to base station BTS2. Let us assume in the example case that there is no direct ATM link between the base stations. Then BTS1 first routes the connection back to port 3 of the ATM switch 20 from where it is routed through port 4 to the base station BTS2. The result is a non-optimal routing, when the connection path has a loop from the switch 20 to the base station BTS1 and back. An optimal routing would require bypassing the loop by connecting the connection directly from port 1 to port 4. Similar loops can be produced in any part of the ATM network.

In order to be able to remove the above described loops, they should first be detected. In the ATM networks a global identifier, which is transferred in the ATM cells, is used for the connection and the loops can be detected by this identifier. If the network node detects that the same global identifier appears at two output ports, it may conclude that the matter referred to is a loop that should be removed. However, in cases where a global identifier is not available, it is difficult to detect that a loop exists. Furthermore, when the loop has been detected, the optimal connection path should be switched in such a manner that transferable cells do not disappear or that their order does not change.

SUMMARY OF THE INVENTION

An object of the invention is thus to develop a method and an equipment implementing the method so that said problems will be solved.

The objects of the invention are achieved with a method for optimizing a connection path in a packet-based telecommunication network in which an access point of a terminal to the network and thereby the routing of a connection path can change during connection. The method is characterized by adding a special packet to an end-to-end packet flow in a network node along the connection path, said network node being able to locally identify said special packet, detecting the looping of the connection path back to said network node if said special packet later returns to said network node, optimizing the connection path by switching the connection path to bypass a loop inside said network node.

The invention further relates to an arrangement to optimize a connection path in a packet-based telecommunication network in which an access point of a terminal to the network can change during connection. The arrangement is characterized by at least one network node along the connection path comprising means for adding to an end-to-end packet flow travelling on a connection path a special packet comprising an identifier by which said network node identifies the connection locally, means for monitoring whether said special packet will later return back to said network node and for thereby detecting the looping of the connection path back to said network node, means for switching the connection inside said network node to a more optimal path bypassing said detected loop.

The invention is based on using a special packet for detecting non-optimal routing or a loop, which special packet any network node on the path can add to the packet flow. The network node provides this special packet with a unique code which the network node uses locally for identifying the special packet and for linking the special packet to a particular established connection. In other words, according to the invention only the network node adding a special packet to the packet flow must be able to identify the unique code and special packet. If there is a loop on the path, the special packet added to the packet flow returns back to the same network node. When the network node detects that a special packet provided with a particular code returns back, it may conclude that on the connection path, to which the unique code is linked, there is a loop that should be removed. Then the network node can internally switch to an optimal route bypassing the detected loop. Furthermore, the network node preferably releases the loop in a way characteristic of the network.

According to a preferred embodiment of the invention also the elimination of a detected loop is based on the use of the special packet. When the network node has detected the loop, the network node sends a second special packet provided with a unique identifier to the same connection having the loop. At the same time the network node starts to buffer possible incoming packets which are meant to be sent to the connection containing the loop. The packets arriving from the loop are normally transmitted forward. When the second special packet reappears from the loop to the network node that sent it, then the loop is "flushed" i.e. all packets sent to the loop before the second special packet and the start of the buffering have returned back and been transmitted forward. Now the network node can bypass the loop by internally switching the connection to an optimal route. When the loop has been bypassed, the network node sends to the optimized path the buffered packets which have arrived after the transmission of the second packet. Using the flushing and buffering based on the special packet of the invention the order of the packets can be preserved during the elimination of the loop and the optimization of the path.

An advantage with the invention is that the loop is removed using the network node's local and internal function which can be implemented without significant changes in the existing switches. In packet-based networks the intermediate nodes along the connection can insert special packets to the packet flow, for example, operation and maintenance cells in the ATM network. The special packet according to the invention is only locally significant, i.e. only the network node adding the special packet to the packet flow has to be able to identify the special packet and to interpret the contents of the special packet. Thus the invention enables the operation without a global connection identifier. Detection and elimination of the loop may be started locally always when the network node is able to suspect that a loop exists, for example, after the network procedures which may cause the formation of a loop in the network in addition or alternatively the network node may start to detect or eliminate the loop regularly or randomly. This is possible since the loop as such is not a failure situation barring appropriate data transmission, but is non-optimally utilizing the network resources. For this reason the optimization of the path can be performed normally without particular haste, although it is preferable to detect and eliminate the loop as early as possible.

BRIEF DESCRIPTION OF THE DRAWINGS

In the following the invention will be described in greater detail in connection with the preferred embodiments with reference to the accompanying drawings, in which.

DETAILED DESCRIPTION OF THE INVENTION

The present invention is applicable to be used in all connection-oriented packet-based telecommunication networks in which, loops can be formed for a connection path. The invention is particularly applicable to be used in connection-oriented packet-based telecommunication networks in which the access point of a terminal to the network changes as a result of the mobility of the terminal when the connection is active. Such telecommunication networks are, for example, wireless packet networks and mobile networks in which the connection-oriented packet network is used as a transmission network between base stations and controlling elements. The primary application area of the invention is ATM networks particularly wireless ATM networks and mobile networks, in the transmission networks of which ATM technique is used.

In the following the primary preferred embodiment of the invention is described in connection with the wireless ATM network with reference to FIGS. 1–4.

Figure 1:
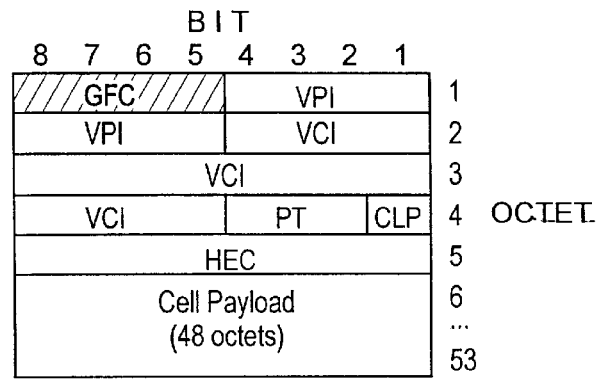
FIG. 1 shows the structure of an ATM cell.
Figure 2:
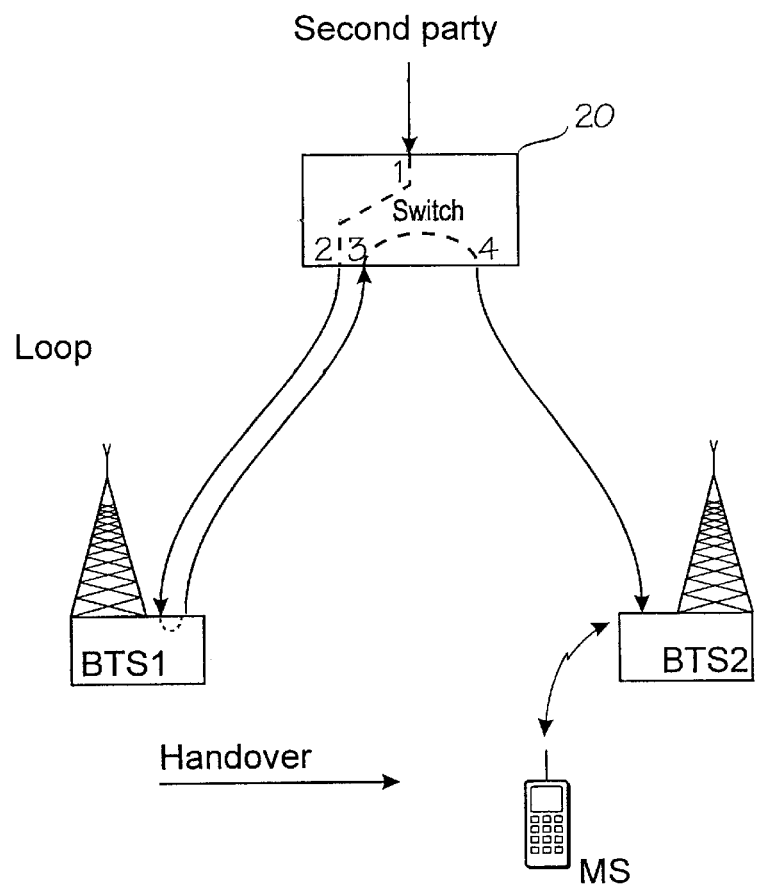
FIG. 2 illustrates the part of a wireless ATM network and a formation of a loop for a connection path as a result of handover.

With reference to FIG. 2 it is assumed that as a result of PE handover the situation formed as described above in which an active virtual ATM connection is routed to port 1 of an ATM switch 20, connected from port 1 to port inside the ATM switch 20, routed from port 2 to a base station BTS1, routed from the base station BTS1 back to the switch 20 to port 3, connected from port 3 to port 4 inside the switch 20, and routed from port 4 to a base station BTS2. BTS2 communicates over the radio path with a mobile station MS. Let us further assume that the ATM switch 20 receives cell flow to port 1, the cell flow containing, for example, ATM cells according to FIG. 1. The switch 20 transmits the cell flow along the path described above to the base station BTS2 which sends information in the downlink direction to the mobile station (as ATM cells or in any other form). In the opposite uplink direction the ATM cell flow can travel along the same route.

The switch 20 knows that PE-handover is being performed (for example based on the signalling associated with handover) and starts a procedure according to the invention to check whether a loop that could be eliminated has been formed for the connection path in connection with handover. Alternatively the switch 20 can randomly or regularly check whether connections travelling through it contain loops.

Figure 3:
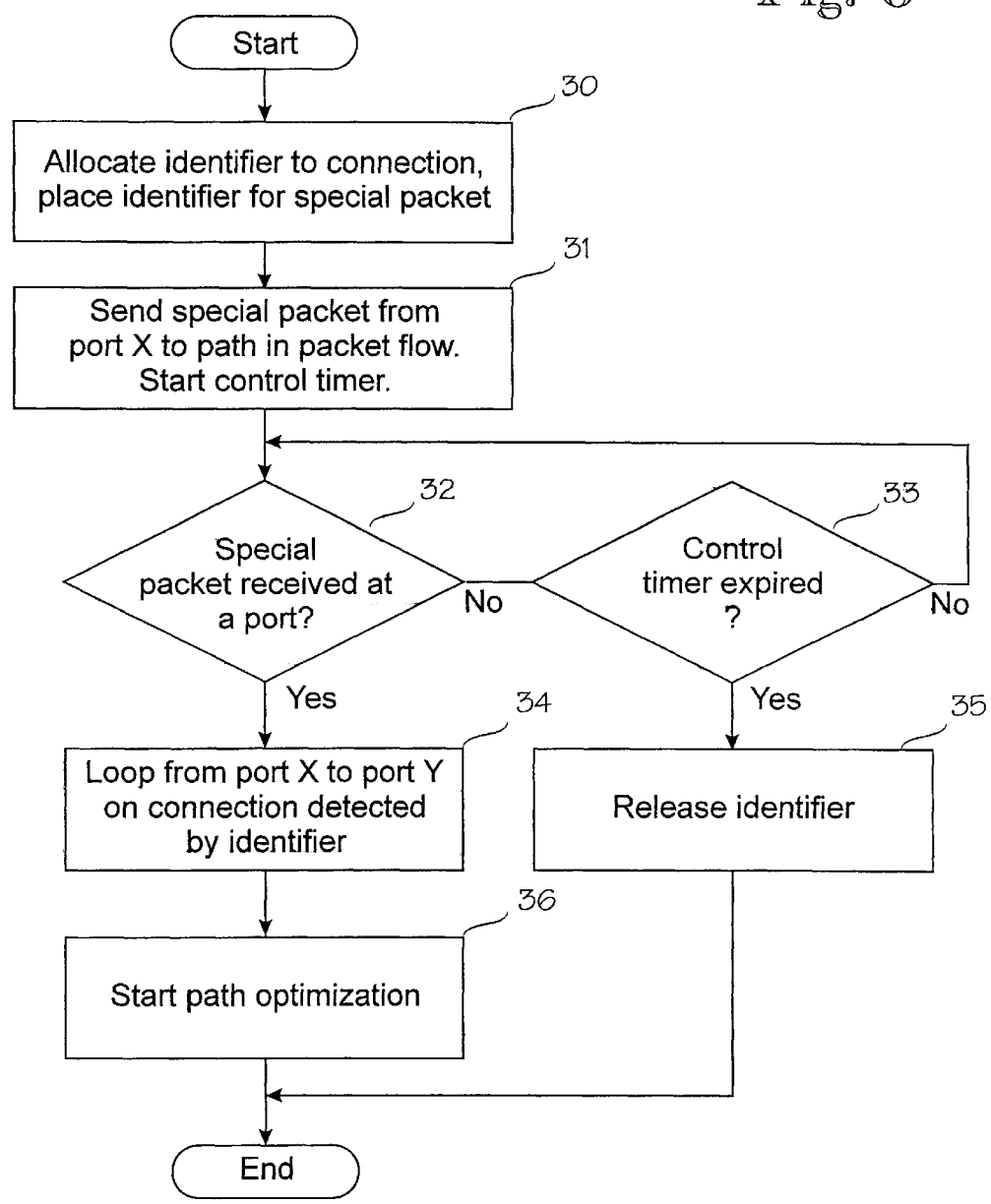
FIG. 3 is a flow chart illustrating an identification of a loop according to the invention in the network node.

With reference to FIG. 3 the switch 20 allocates to the connection which is to be checked a unique identifier code which is inserted in the special packet (step 30). The switch 20 uses the identifier code locally for identifying the special packet and for binding the special packet to a particular formed connection. The identifier code can be a code of any form applicable to the purpose. Different ATM switches may even use different type of codes. The special packet may, for example, be an ATM operation and maintenance cell indicated by a PT (Payload type) of the cell. Then the PT value is 100 or 101. For this purpose a new special cell may also be defined, and the special cell may be given, for example, the PT value 110 or 111 which is yet undefined. The identifier code may be located in the information field of the cell. It should, however, be noted that the type of the special packet, the way it is identified and the way by which an allocated identifier code is located in it are not significant for the invention. The invention only requires that the switch 20 is able to identify the special packet it has sent and to link it to a particular ATM connection. Thus, the routing or address information of the packet, such as at least a VCI (Virtual Channel Identifier) in the ATM cell, have to be the same as the ones in the user packet flow transferred over the connection. Thus, a special packet sent by a switch 10 is routed in the same way as the actual packet flow of the end user. A VCI (Virtual Channel Identifier) of the ATM cell does not necessarily have to be the same as in the user cells, since the special packets (such as OAM cells typically) may use a different virtual channel on the same path.

The switch 20 sends the special packet from an output port 2 towards the base station BTS1 and starts a control timer, step 31. Then the switch 20 checks if the special packet has been received at any input port of the switch 20, step 32. If the special packet has not been received it is checked whether the control timer has expired, step 33. Time measured by the control timer is a period of time exceeding the maximum transmission delay in the network, i.e. the maximum time that the special packet would need for the possible loop to pass. If the control timer has expired in step 33, it can be assumed that there is no loop on the path and the waiting for the special packet can be stopped. Then the identifier code allocated to the connection is released, step 35, and the identifying procedure of the loop is completed.

If the control timer has not expired in step 33, the procedure returns to step 32. In the example in FIG. 2 the special packet travels through the base station BTS1 back to the switch 20 to port 3. When it is detected in step 32 that the special packet has been received to the input port 3, the switch 20 concludes that the ATM connection indicated by the identifier included in the special packet has a loop between ports 2 and 3, step 34. Then the switch 20 starts a path optimization procedure, step 36, and completes the detection procedure of the loop.

Figure 4:
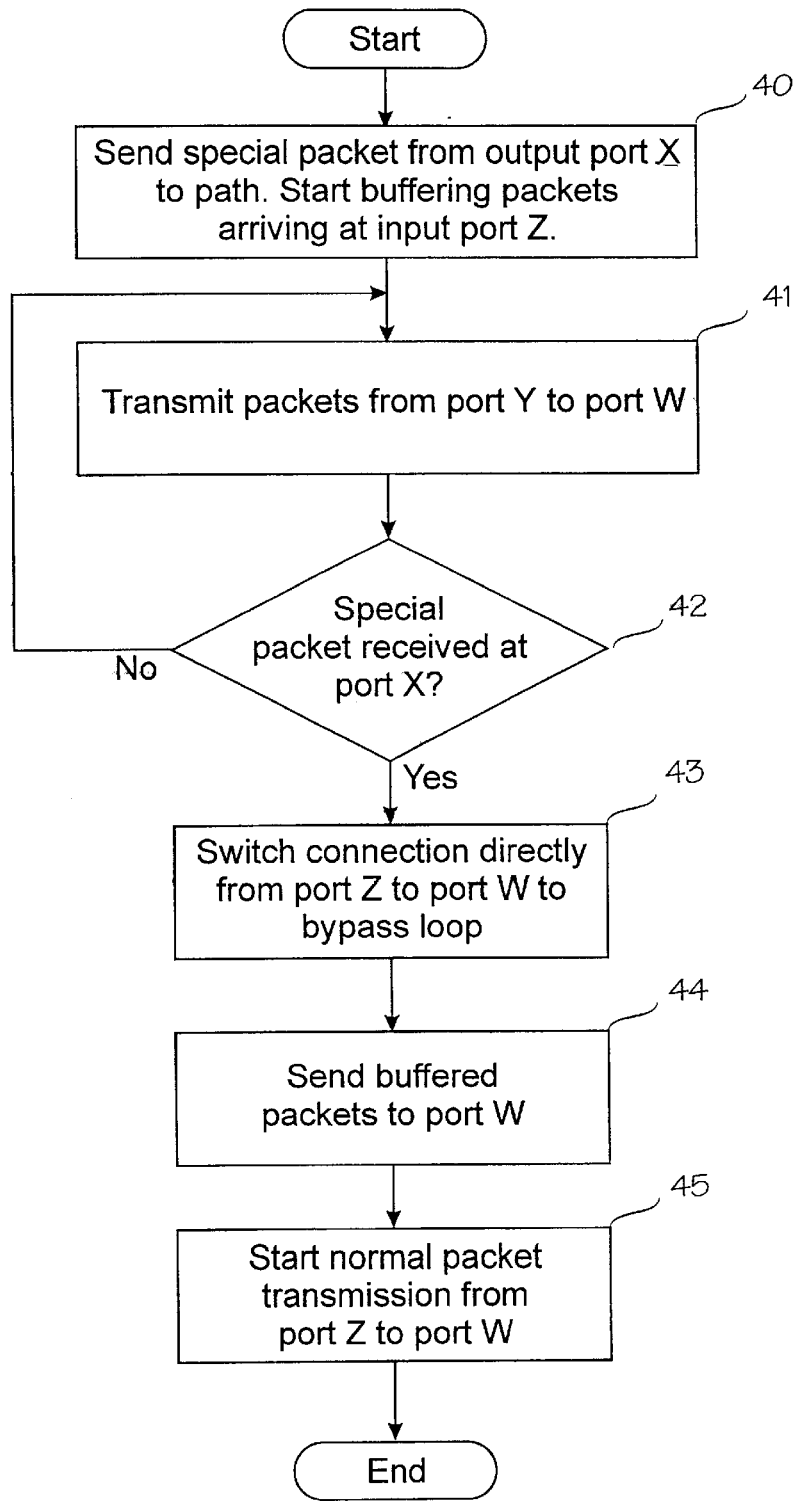
FIG. 4 is a flow chart illustrating an elimination of a loop according to the invention in the network node.

The flow chart in FIG. 4 illustrates an example of the optimization procedure of the invention also based on the use of the special packet. First in step 40 the switch 20 sends a second special packet equipped with a unique identifier to the same connection where the loop is, i.e. from port 2 to the base station BTS1. Simultaneously the switch 20 starts to buffer the packets which possibly arrive at port 1 using the connection containing the loop. The switch 20 continues to transmit the packets arriving at port 3 from the loop (the base station BTS1) normally forward to port 4 and to the base station BTS2, step 41. In step 42 it is checked whether the special packet has returned from the loop to port 3. If not, the procedure returns to step 41. When the second special packet reappears from the loop to the switch 20 to port 3, the loop is "flushed", i.e. all packets sent to the loop before the second special packet and the start of the buffering have returned back and been transmitted forwards. Now the switch 20 bypasses the loop by internally switching the connection directly from port 1 to port 4, step 43. When the loop has been bypassed the switch 20 sends all packets buffered after step 40 through port 4 to the base station BTS2, step 44. Then the switch 20 starts transmitting the normal packet flow directly from port 1 to port 4, step 45. Thus, the loop has been eliminated and at the same time the packet order has been preserved and the optimization procedure can be completed.

The above described switch 20 may be any network element provided with an ATM switching function, such as a conventional ATM network switch, a wireless ATM network switch, another telecommunication network element equipped with an ATM switching function. Implementation examples of the wireless ATM network and a mobile network using ATM technique have been described, for example, in the Finnish patent applications 971178 and 970602 which are incorporated herein as references.

The Figures and the description associated with them are only meant to illustrate the present invention. The invention and the preferred embodiments of the invention are thus not restricted to the above described examples but can vary within the scope of the claims.

What claimed is:

1. A method for optimizing a connection path in a packet-based telecommunication network in which an access point of a terminal to the network and thereby routing of a connection path can change during connection, comprising:

adding a special packet to an end-to-end packet flow in a network node along the connection path;

providing said special packet with a unique code that enables said network node to locally identify said special packet and said connection;

detecting looping of the connection path back to said network node by said network node in response to a special packet including the unique code provided by said network node later returning to said network node; and optimizing the connection path in response to detected looping of the connection path by switching the connection path to bypass a the detected loop inside said network node.

2. A method as claimed in claim 1, wherein said optimizing comprises:

starting buffering of end-to-end packets which are to be sent to the loop in said network node;

sending from said network node to the loop a second special packet which the network node is able to locally identify;

receiving said second special packet from the loop to said network node;

switching the connection path to bypass said loop inside said network node; and sending buffered end-to-end packets from said network node onwards to the optimized connection path while preserving packet order.

3. A method as claimed in claim 1, further comprising: adding said special packet to the end-to-end packet flow regularly, randomly or after a network procedure, which may cause a formation of the loop in the network.

4. A method as claimed in claim 3, wherein said network procedure includes a handover procedure to hand over the terminal in the network from one network access point to another.

5. A method as claimed in claim 1, further comprising adding said special packet to the end-to-end packet flow regularly, randomly or after a network procedure, which may cause a formation of the loop in the network, and said network procedure comprises a handover procedure for handing over a mobile station from one base station to another.

6. A method as claimed in claim 1, wherein said special packet is an ATM operation or maintenance cell.

7. A method for optimizing a connection path in a packet-based telecommunication network in which an access point of a terminal to the network and thereby routing of a connection path can change during connection, comprising:

adding a special packet to an end-to-end packet flow in a network node along the connection path;

providing said special packet with a unique code that enables said network node to locally identify said special packet and said connection;

detecting looping of the connection path back to said network node by said network node in response to a special packet including the unique code provided by said network node later returning to said network node; and optimizing the connection path in response to detected looping of the connection path by switching the connection path to bypass the detected loop inside said network node, wherein the telecommunication network is an ATM based mobile network comprising mobile stations, base stations, at least one controlling mobile network element and an ATM transmission network connecting said controlling mobile network element and the base stations, said network node is said controlling mobile network element and/or an ATM switch and/or a base station of the ATM transmission network, and the packet are ATM cells.

8. A method as claimed in claim 7, wherein said optimizing comprises:

starting buffering of end-to-end packets which are to be sent to the loop in said network node;

sending from said network node to the loop a second special packet which the network node is able to locally identify;

receiving said second special packet from the loop to said network node;

switching the connection path to bypass said loop inside said network node; and sending buffered end-to-end packets from said network node onwards to the optimized connection path while preserving packet order.

9. A method as claimed in claim 7, further comprising:

adding said special packet to the end-to-end packet flow regularly, randomly or after a network procedure, which may cause a formation of the loop in the network.

10. A method as claimed in claim 9, wherein said network procedure includes a handover procedure to hand over the terminal in the network from one network access point to another.

11. A method as claimed in claim 7, further comprising adding said special packet to the end-to-end packet flow regularly, randomly or after a network procedure, which may cause a formation of the loop in the network, and said network procedure comprises a handover procedure for handing over a mobile station from one base station to another.

12. A method as claimed in claim 7, wherein said special packet is an ATM operation or maintenance cell.

13. An arrangement to optimize a connection path in a packet-based telecommunication network in which an access point of a terminal to the network can change during connection, wherein at least one network node along the connection path comprises:

means for adding to an end-to-end packet flow travelling on the connection path a special packet including a unique code that enables said network node to locally identify said special packet and said connection;

means for monitoring whether said special packet comprising the unique code provided by said network node later returns back to said network node and for thereby detecting a loop and/or looping of the connection path back to said network node; and means for switching the connection inside said network node to a more optimal path bypassing said detected loop/wherein the telecommunication network is a wireless ATM network comprising mobile stations and at least one ATM switch to which base stations are connected, said network node is an ATM switch and/or a base station, and the packets are ATM cells.

14. An arrangement as claimed in claim 13, wherein said switching means comprises:

means for sending a second special packet comprising an identifier from said network node to said loop;

means for receiving said second special packet from the loop to said network node;

means for switching the connection path to bypass said loop inside said network node in response to receiving the second special packet; and buffer means responsive to the detection of the loop and/or sending said second special packet for initiation to buffer end-to-end packets which are to be sent to the loop in said network node and for sending, after switching the optimized connection path, the buffered packets from said network node onwards to the optimized connection path while preserving the packet order.

15. An arrangement as claimed in claim 13 wherein said network node is arranged to add the special packet to the end-to-end packet flow regularly, randomly or after a network procedure which may cause formation of the loop in the network.

16. An arrangement as claimed in claim 15, wherein said network procedure comprises a handover procedure to hand over a mobile station in the network from one network access point to another.

17. An arrangement as claimed in claim 10, wherein said network node is arranged to add the special packet to the end-to-end packet flow regularly, randomly or after a network procedure which may cause the formation of the loop in the network, and said network procedure comprises a handover procedure to hand over a mobile station from one base station to another.

18. An arrangement to optimize a connection path in a packet-based telecommunication network in which an access point of a terminal to the network can change during connection, wherein at least one network node along the connection path comprises:

means for adding to an end-to-end packet flow travelling on the connection path a special packet including a unique code that enables said network node to locally identify said special packet and said connection;

means for monitoring whether said special packet comprising the unique code provided by said network node later returns back to said network node and for thereby detecting a loop and/or looping of the connection path back to said network node; and means for switching the connection inside said network node to a more optimal path bypassing said detected loop, wherein the telecommunication network is an ATM-based mobile network comprising mobile stations, base stations, at least one controlling mobile network element and an ATM transmission network connecting said controlling mobile network element and the base stations, a said network node is said controlling mobile network element and/or an ATM switch and/or a base station of the ATM transmission network and the packets are ATM cells.

19. An arrangement as claimed in claim 18, wherein said switching means comprises:

means for sending a second special packet comprising an identifier from said network node to said loop;

means for receiving said second special packet from the loop to said network node;

means for switching the connection path to bypass said loop inside said network node in response to receiving the second special packet; and buffer means responsive to the detection of the loop and/or sending said second special packet for initiation to buffer end-to-end packets which are to be sent to the loop in said network node and for sending, after switching the optimized connection path, the buffered packets from said network node onwards to the optimized connection path while preserving the packet order.

20. An arrangement as claimed in claim 18, wherein said network node is arranged to add the special packet to the end-to-end packet flow regularly, randomly or after a network procedure which may cause formation of the loop in the network.

21. An arrangement as claimed in claim 20, wherein said network procedure comprises a handover procedure to hand over a mobile station in the network from one network access point to another.

22. An arrangement as claimed in claim 18, wherein said network node is arranged to add the special packet to the end-to-end packet flow regularly, randomly or after a network procedure which may cause the formation of the loop in the network, and said network procedure comprises a handover procedure to hand over a mobile station from one base station to another.

* * * * *